United States Patent

[11] 3,625,431

| [72] | Inventor | Alf Helmer Andersson<br>Ystad, Sweden |
|---|---|---|
| [21] | Appl. No. | 4,278 |
| [22] | Filed | Jan. 20, 1970 |
| [45] | Patented | Dec. 7, 1971 |
| [73] | Assignee | Ystads Gjuteri & Mekaniska Verkstads<br>Aktiebotag<br>Ystad, Sweden |

[54] ARTIFICIAL MANURE SPREADER
4 Claims, 6 Drawing Figs.

[52] U.S. Cl. ................................................... 239/222.17, 239/381
[51] Int. Cl. ....................................................... B05b 3/04
[50] Field of Search ............................................. 222/412, 410, 414, 491; 239/222.17

[56] References Cited
UNITED STATES PATENTS

| 974,176 | 11/1910 | Newman | 239/239.17 X |
|---|---|---|---|
| 3,532,273 | 10/1970 | Siddall et al. | 239/239.17 |
| 3,232,458 | 2/1966 | Freeman | 222/410 X |
| 2,601,608 | 6/1952 | Hansen | 222/413 |

FOREIGN PATENTS

| 445,177 | 2/1968 | Sweden |
|---|---|---|
| 1,498,719 | 9/1967 | France |
| 28,060 | 12/1912 | Great Britain |
| 284,449 | 8/1913 | Germany |

*Primary Examiner*—Samuel F. Coleman
*Assistant Examiner*—Norman I. Stack, Jr.
*Attorney*—John Lezdey

ABSTRACT: An artificial manure spreader having spreader means including an ejector fan and a number of conveying pipes from the fan to spreader units each comprising a rotational body having an inclined diametrical plane the ends of said plane being disposed each on one side of the axis of rotation of the rotational body, said inclined plane having along one longitudinal edge a wing which at the lower end of the inclined plane merges in a wing element extending obliquely to the main plane of the wing and inwardly over the inclined plane.

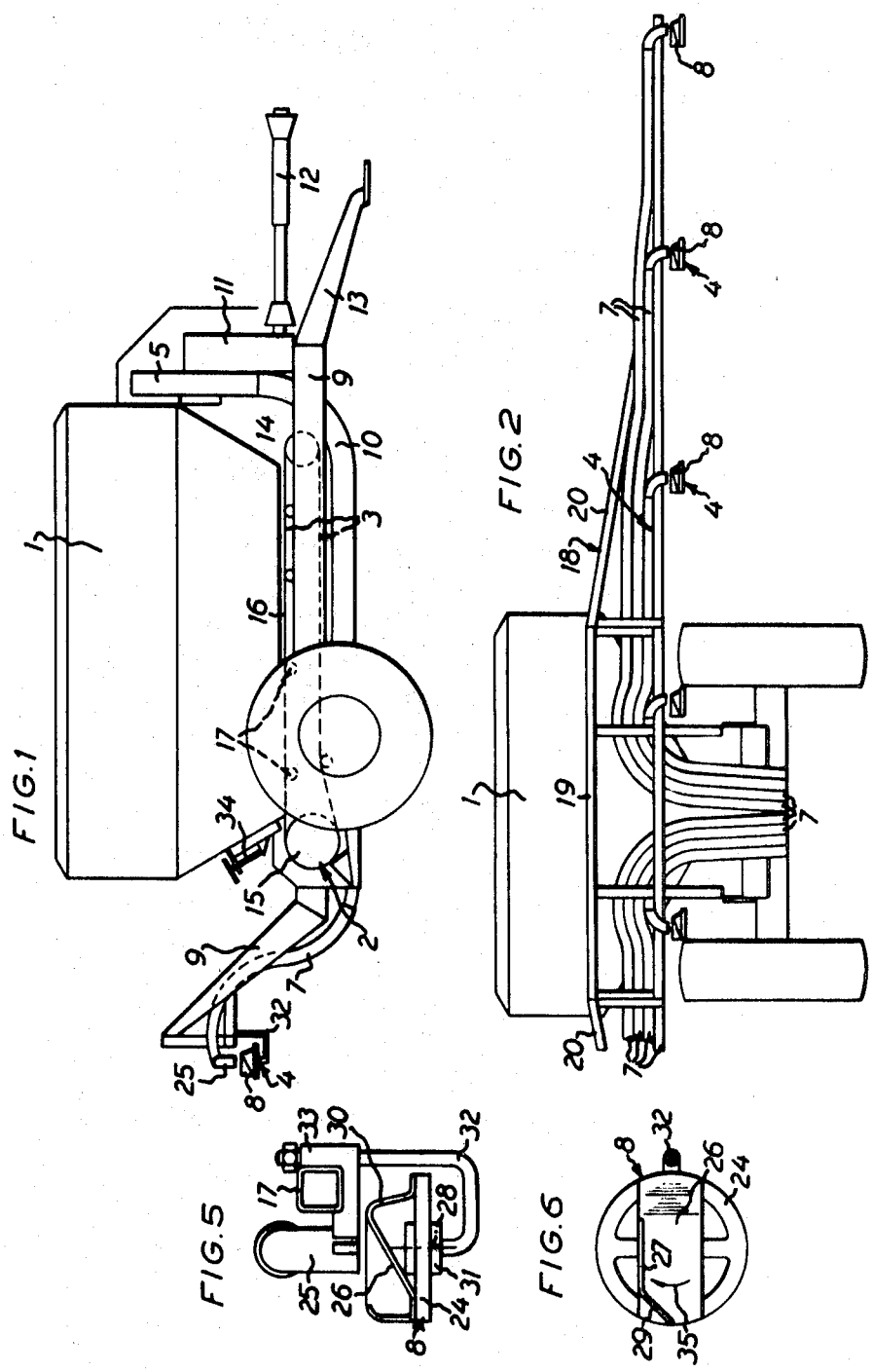

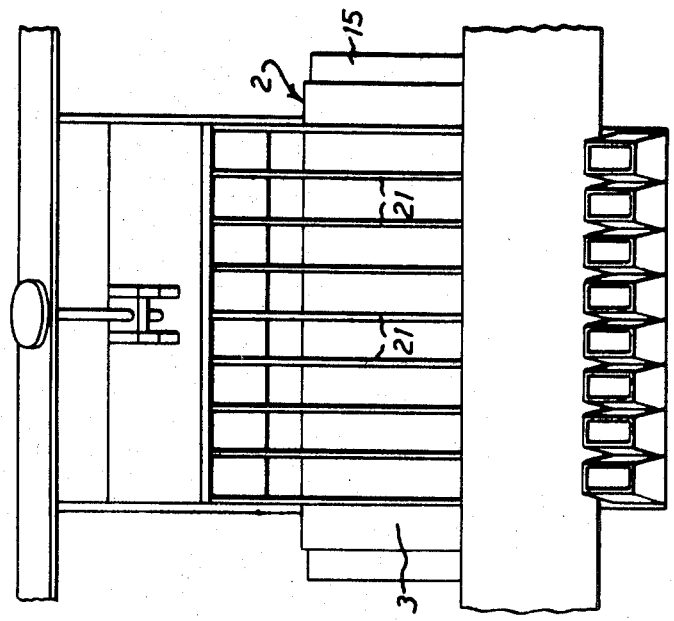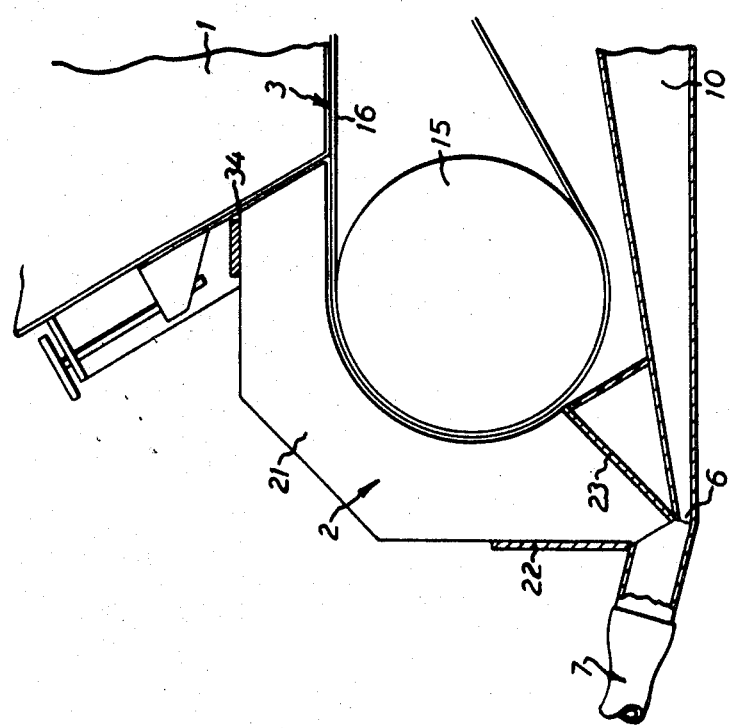

ARTIFICIAL MANURE SPREADER

The present invention relates to an artificial manure spreader comprising a hopper and below the hopper a distributor means in the form of a conveyor provided in the bottom of the hopper and projecting outside at least one end of the hopper, and spreader means located at the conveyor outlet end projecting outside the hopper, said spreader means including an ejector fan with an exhaust opening connected to a number of conveying pipes which are open towards the fan and the conveyor outlet end, the other ends of said pipes being associated with spreader units comprising a rotational body adapted to be put in rotation about an axis by means of the air current leaving the conveying pipe. Artificial manure spreaders should permit accurate dosage and uniform spread. Such spreaders should also have a large working width. Combined with these properties, the manure spreader should have a great bulk load capacity and in spite of its large working width it should be possible to run it on public roads, yet it should be of a simple and sturdy construction. All this is realized in that the rotational body on its side facing the outlet opening of the conveying pipe has an inclined plane extending diametrically in relation to the rotational body, the ends of said plane, of which the upper end is close to the opening of the outlet pipe and the lower end remote from the opening of the outlet pipe, being disposed each on one side of the axis of rotation of the rotational body, said inclined plane having along one longitudinal edge a wing which at the lower end of the inclined plane merges in a wing element extending obliquely to the main plane of the wing and inwardly over the inclined plane.

The invention will now be described with reference to the accompanying drawings in which:

FIG. 1 is a side elevation of the artificial manure spreader;

FIG. 2 is a part end elevation of said manure spreader;

FIG. 3 is an enlarged part sectional view of a distributor means included in said manure spreader;

FIG. 4 is an end view of said distributor means;

FIG. 5 is a side elevation of one of several spreader units included in said manure spreader;

FIG. 6 is a top plan view of said spreader unit.

The artificial manure spreader shown in the drawings comprises a hopper 1 and, below the hopper 1, distributor means generally designated 2, in the form of a conveyor 3 provided in the bottom of the hopper. In the example shown the conveyor 3 forms the bottom of the hopper 1 and projects at least with one end, the rear and outlet end, outside the hopper 1. Provided at the outlet end of the conveyor 3 are spreader means, generally designated 4. The spreader means 4 include an ejector fan 5 with an exhaust opening 6 connected to a number of conveying pipes 7 which are open towards the fan 5 and the outlet end of the conveyor 3, the other ends of said pipes being associated with spreader units 8. The fan 5 is positioned in the front part of a wheeled frame 9 and through a main pipe 10 and the conveyor pipes 7 the fan is connected with its spreader units 8 positioned in the rear part of the frame. The frame 9 supports, in addition to the fan 5, the hopper 1, the distributor means 2 and the spreader means 4 and the other stationary and movable parts of the manure spreader. By means of a gearing 11, via a transmission shaft 12, the fan 5 can be drivingly connected with the power takeoff shaft of a tractor (not shown) for driving the manure spreader. The frame 9 is provided with a drawbar 13 by means of which the manure spreader can be hitched to the tractor.

The conveyor 3, which is in the form of a belt conveyor, is drawn over pulleys 14 and 15 and the bottom-forming run 16 of the belt is further supported by rollers 17. The conveyor 3 is drivingly connected with the transmission shaft 12 in a manner not specifically shown. The conveying pipes 7 and the spreading units 8 are carried by a ramp 18 including a stationary ramp section 19 of approximately the same width as the manure spreader, and two pivotable ramp sections 20. The conveying pipes 7 are at least partly made from an elastic material such that the pivotable ramp sections 20 can be swung from their swung-out spreading positions extending transversely of the manure spreader, as shown in FIG. 2, to inactive positions, not shown, in the longitudinal direction of the manure spreader. The conveying pipes 7 are drawn from the opening 6 of the fan 5 up to the spreader units 8 without any sharp bends.

Arranged at the outlet end of the conveyor 3 is a number of walls 21 the main planes of which extend in parallel with the vertical main plane of the conveyor 3 and from the upper side of the conveyor run 16 to a level below the lower run of the conveyor 3. The walls 21 adjoin at their lower ends a vertical transverse wall 22 and a bottom wall 23. The transverse wall 22 and the bottom wall 23 define a funnel-shaped space which at its bottom is connected with the fan opening 6 and those ends of the pipes 7 which are open towards the fan 5.

The spreader units 8 comprise each a rotational body 24 adapted to be put in rotation by means of the current of air leaving the respective conveying pipe 7. The rotational body 24 comprises on its side facing the outlet opening 25 of the conveying pipe 7 an inclined plane 26 which extends diametrically in the transverse direction of the rotational body and which is provided with a laterally disposed wing 27 which includes a wing element 29 at the lower end of the wing spaced from the axis of rotation, represented by a dot-and-dashed line 28, of the rotational body 24, said wing element extending obliquely in relation to the remaining wing 27, for purposes to be described below. The inclined plane 26 consists of one of the shanks of an angularly bent sheet plate which with the ends of its shanks 26, 30 is secured to the rotational body 24. A bearing for the rotational body is designated by 31. The bearing 31 is secured on an arm 32 which by means of a bracket 33 is secured in the ramp 18. The bracket 33 also forms a fastening means for the opening portion 25 of the conveying pipe 7. By means of a manually operated regulator 34 the thickness of the artificial manure layer fed out by the active run 16 of the conveyor 3 can be varied and the amount to be spread can be controlled.

When the artificial manure spreader is running and the conveyor 3 feeds out the adjusted artificial manure layer the walls 21 divide this layer into sublayers which, due to the ejector effect of the fan 5, are continuously introduced into the conveyor pipes 7 and are passed on through these pipes by means of the air current from the fan 5. When leaving the outlet end 25 of the conveying pipe 7, the air jet and the artificial manure entrained by this jet hit the rotational body 24 and its inclined plane 26, which changes the direction of movement of the manure and ejects it at the same time as the rotational body 24 is put in rotation in the direction of the arrow 35 in that the air current along the inclined plane 26 hits the wing element 29. This results in an accurately dosed and uniform spread.

Modifications are possible within the scope of the inventive idea such as this is defined in the following claims.

What I claim and desire to secure by Letters Patent is:

1. An artificial manure spreader comprising a hopper, a conveyor belt in the bottom of said hopper, an ejector fan having its exhaust opening located at the outlet of said belt, a plurality of conveying pipes having one end of each of said pipes connected to said exhaust opening of said ejector fan and being open towards the outlet of said belt, and spreader means at the other end of each of said conveying pipe, said spreader means comprising a rotational body adapted to be rotated about an axis by means of the air current leaving said associated conveying pipe, said rotational body having an inclined plane extending diametrically in relation to said body on both sides of the axis and facing said other end of the conveying pipe, a wing placed on edge and extending along one longitudinal edge of the inclined plane and offset from the axis, and a wing element placed on edge and located at the lower end of the inclined plane and extending obliquely to the main plane of the said wing and inwardly over the inclined plane, whereby the air current from the fan entrains the artificial manure, carries it through the conveying pipe, hits the rotational body so as to set it in motion and eject the artificial manure.

2. The artificial manure spreader of claim 1 wherein said inclined plane is formed by one of the shanks of an angularly bent sheet plate, the other shank of said plate extending substantially parallel with the axis of rotation of said rotational body.

3. The artificial manure spreader of claim 2 wherein said plate has the ends of the shanks secured in said rotational body.

4. The artificial manure spreader of claim 1 including regulator means on said hopper for regulating the thickness of the artificial manure layer fed on said belt.

* * * * *